June 23, 1931. W. E. NOBBE 1,810,980
METHOD AND APPARATUS FOR FORMING SHEET GLASS
Filed Jan. 28 1928
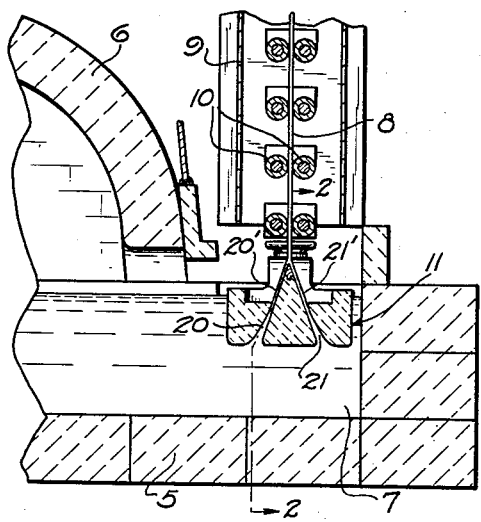
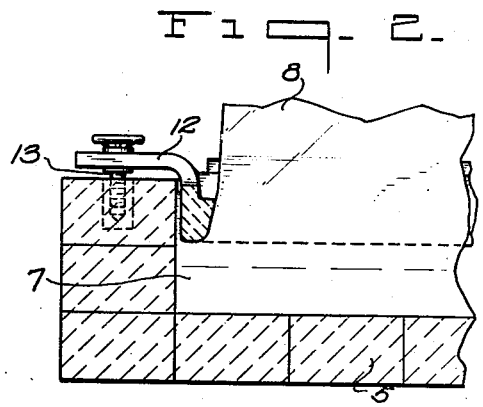
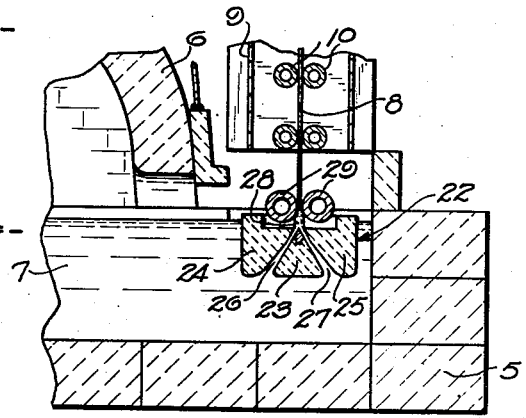
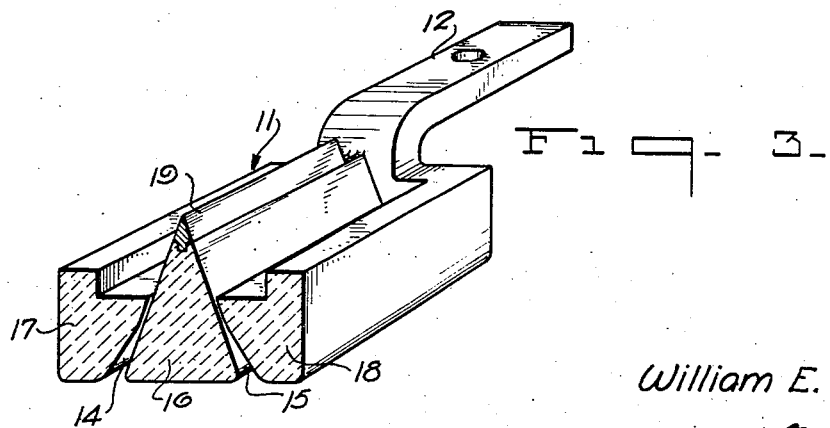
Inventor
William E. Nobbe.
By Frank Fraser
Attorney Patented June 23, 1931

1,810,980

UNITED STATES PATENT OFFICE

WILLIAM E. NOBBE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR FORMING SHEET GLASS

Application filed January 28, 1928. Serial No. 250,127.

The present invention relates broadly to the manufacture of glassware and more particularly to a method of and apparatus for producing sheet glass in continuous or substantially continuous flat sheet form.

An important object of the present invention is the provision of an improved method of and apparatus for facilitating and improving generally the forming of glass in sheet form from a bath of molten glass.

Another object of the invention is to provide an improved method and apparatus of the herein described nature wherein a plurality of streams of molten glass are fed preferably upwardly under pressure from a molten bath, the said streams being then united to form a single sheet.

A further object is the provision of apparatus wherein preferably two streams of molten glass are created under hydrostatic pressure, the said streams being passed upwardly over and in contact with suitable directing surfaces, united, and then continued in the form of a single sheet.

Other objects and advantages of the invention will become more apparent during the course of the following description when taken in connection with the accompanying drawings.

In the drawings forming a part of this application and wherein like numerals are employed to designate like parts throughout the same.

Figure 1 is a vertical longitudinal section through apparatus constructed in accordance with the present invention.

Figure 2 is a section taken substantially on line 2—2 of Figure 1.

Figure 3 is a perspective sectional view of the slotted member or deputer, and

Figure 4 shows a somewhat modified type of apparatus.

Referring to the drawings, 5 designates the forehearth or drawing chamber connected with a melting tank 6 preferably of the regenerative type and containing the molten bath 7 from which the glass sheet or ribbon 8 is adapted to be continuously or substantially continuously drawn and passed upwardly through the vertical leer 9.

The means herein employed for drawing the glass sheet comprises a series of pair of rollers 10 driven by any suitable means and made up of asbestos discs or a central supporting member having an asbestos covering. The rolls on one side of the sheet are preferably fixed against lateral movement while the rolls on the other side are yieldably pressed against the sheet by means of counterweighted levers as is well known in the art. Any other suitable drawing means might of course be employed without departing from the spirit of the invention and the sheet after being formed may be continued vertically as herein shown or deflected about a suitable bending member into the horizontal plane and annealed while travelling in said plane.

Adapted to be forced downwardly or partially immersed within the molten bath 7 is a deputer designated in its entirety by the numeral 11, said deputer consisting ordinarily of a single elongated slab extending substantially the entire width of the drawing chamber 5 and being provided at its opposite ends with extensions 12 through which pass means 13 for securing the same in position.

As shown particularly in Figure 3, the deputer or slab is provided preferably with a pair of spaced longitudinally extending upwardly converging slots 14 and 15 which divide the same into what might be properly termed three portions namely, the central portion 16 and the outer side portions 17 and 18, all of which are connected at their opposite ends to form an integral structure. The central portion 16 of the deputer is of substantially triangular formation in cross section and projects upwardly beyond the side portions 17 and 18 as clearly shown. Carried by the top of the central portion is a tip 19 preferably formed from a suitable non-corrosive metal alloy such as nichrome, monel or the like and secured in place in any suitable manner and by any desired means.

In forming the glass sheet 8, the deputer 11 is forced downwardly within the molten bath 7 to the desired depth and secured in such position by the means 13. When this is done, it will be apparent that a certain amount of glass will be forced upwardly through the slots 14 and 15 under hydrostatic pressure whereby to create or form the two streams of molten glass 20 and 21. These streams are then drawn upwardly over and in contact with the opposite surface of the central portion 16 of the deputer as indicated at 20' and 21' or, in other words, the streams 20 and 21 are increased in vertical extent. The said streams are then united at the upper end of portion 16 to form the single sheet 8 which is of substantially uniform and predetermined thickness.

In Figure 4 is shown a somewhat modified construction wherein the deputer or slab is generally designed by the numeral 22 and wherein the central portion 23 of the slab does not extend above the side portions 24 and 25 but terminates substantially on the level with the adjacent inner portions thereof and beneath the level of the molten bath 7. Thus, when this type of deputer is used, the two streams of molten glass 26 and 27 will be forced upwardly under hydrostatic pressure to the top of the central portion 23 and will be united as at 28. A pair of rolls 29 may be provided to assist in reducing the glass to the desired sheet thickness as it is drawn upwardly by the pairs of rolls 10.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a deputer adapted to be partially immersed within a bath of molten glass, said deputer consisting of an elongated slab having a pair of spaced longitudinally extending slots, said slots being inclined from the vertical and convergent with respect to each other.

2. The method of forming sheet glass which consists in creating two upwardly flowing streams of molten glass under hydrostatic pressure, uniting said streams at their upper ends to form a single sheet, and then continuing upward movement of said sheet.

3. The method of forming sheet glass which consists in feeding upwardly from a bath of molten glass two spaced streams of glass under hydrostatic pressure, passing the streams in spaced relation to a point above the level of the molten bath, uniting said streams at their upper ends to form a single sheet, and then continuing upward movement of said sheet.

4. The method of forming sheet glass which consists in creating two upwardly flowing streams of molten glass under hydrostatic pressure, passing the upwardly moving streams over and in contact with stationary directing surfaces, uniting said streams as they leave said surfaces to form a single sheet, and then continuing upward movement of said sheet.

5. The method of forming sheet glass which consists in feeding upwardly from a bath of molten glass two spaced streams of glass under hydrostatic pressure, passing said upwardly moving streams over and in contact with stationary converging directing surfaces, in uniting said streams as they leave said surfaces to form a single sheet, and then continuing upward movement of said sheet, the merging point of the two streams being located above the level of the molten bath.

6. The method of forming sheet glass which consists in drawing a plurality of streams of molten glass upwardly from a molten bath, uniting said streams at their upper ends and while they are still in a substantially vertical position to form a single sheet, and in continuously forcing glass upwardly into the stream sources under hydrostatic pressure.

7. The method of forming sheet glass which consists in drawing a plurality of streams of molten glass upwardly from a molten bath over and in contact with converging stationary directing surfaces, uniting said streams as they leave said surfaces to form a single sheet, and in continuously forcing molten glass upwardly into the stream sources under hydrostatic pressure.

8. In sheet glass apparatus, a deputer adapted to be partially immersed within a bath of molten glass, said deputer consisting of an elongated slab having a pair of spaced slots extending substantially vertically therethrough, that portion of the slab between said slots extending above the level of said molten bath.

9. In sheet glass apparatus, a deputer adapted to be partially immersed within a bath of molten glass, said deputer consisting of an elongated slab having a pair of spaced slots extending substantially vertically therethrough, that portion of the slab between said slots extending above the level of said molten bath and terminating in a single edge.

10. In sheet glass apparatus, a deputer adapted to be partially immersed within a bath of molten glass, said deputer consisting of an elongated slab having a pair of spaced, longitudinally extending slots, said slots being inclined from the vertical and convergent with respect to each other, that portion of the slab between the slots extending upwardly above the level of the molten bath.

11. In sheet glass apparatus, a deputer adapted to be partially immersed within a bath of molten glass, said deputer consisting of an elongated slab having a pair of spaced, longitudinally extending slots, said slots being inclined from the vertical and convergent with respect to each other, that portion of the slab between the slots extending upwardly above the level of the molten bath and terminating at its upper end in a single edge.

12. In sheet glass apparatus, a deputer adapted to be partially immersed within a bath of molten glass, said deputer consisting of an elongated slab having a pair of spaced, longitudinally extending slots, said slots being inclined from the vertical and convergent with respect to each other whereby to divide the slab into a central portion and opposite side portions, said central portion being of substantially triangular formation in cross section and projecting upwardly beyond the side portions and terminating at its upper end in a single edge.

Signed at Toledo, in the county of Lucas and State of Ohio, this 26th day of January, 1928.

WILLIAM E. NOBBE.